Inventor
Willard L. Morrison
by Parker Harter
Attorneys.

April 4, 1950     W. L. MORRISON     2,502,663
REFRIGERANT CONTROL SYSTEM
Filed May 12, 1944     3 Sheets-Sheet 2
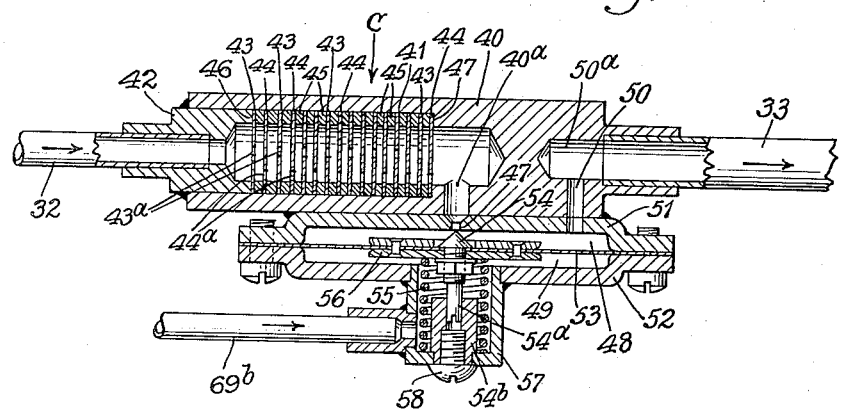
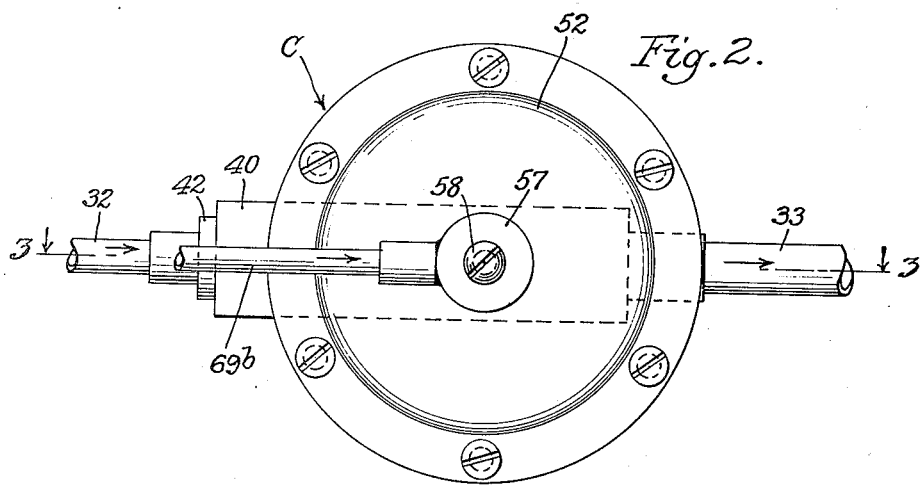
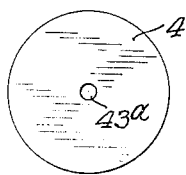 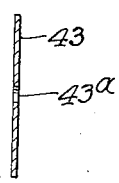 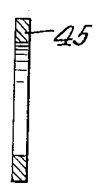 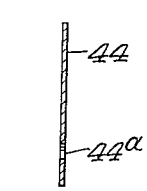 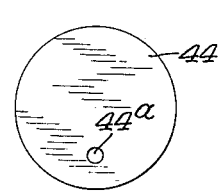
Inventor
Willard L. Morrison
by Parker & Carter
Attorneys.

April 4, 1950     W. L. MORRISON     2,502,663
REFRIGERANT CONTROL SYSTEM
Filed May 12, 1944            3 Sheets-Sheet 3
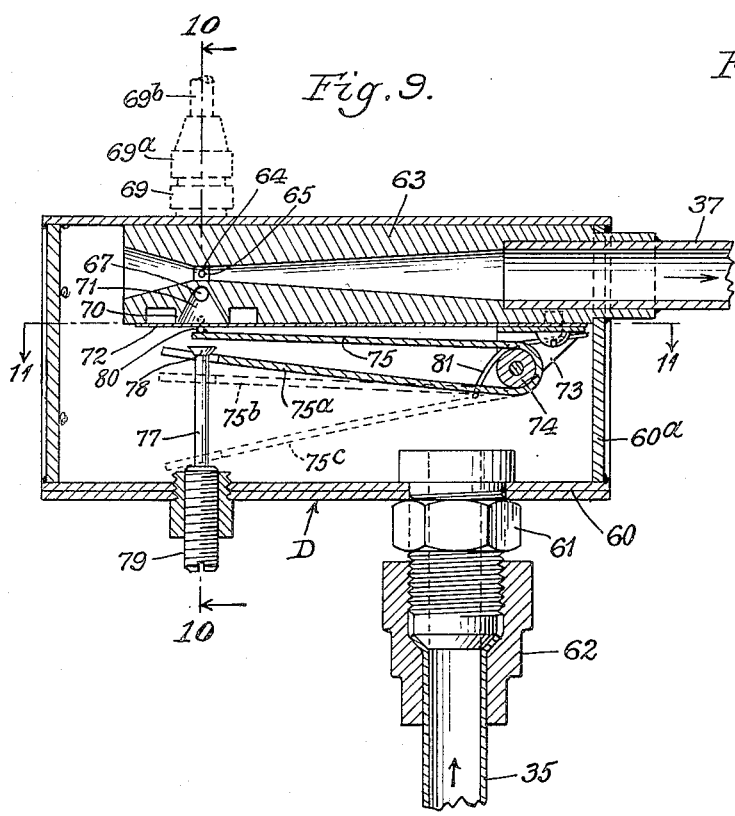
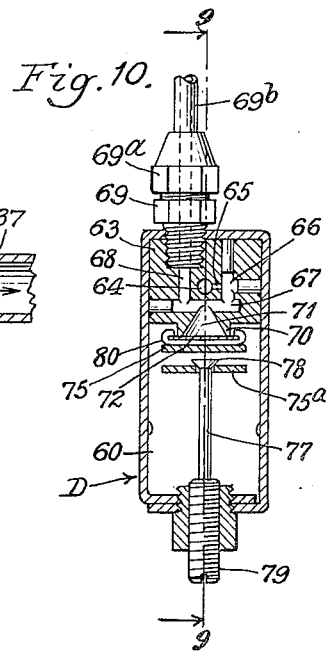
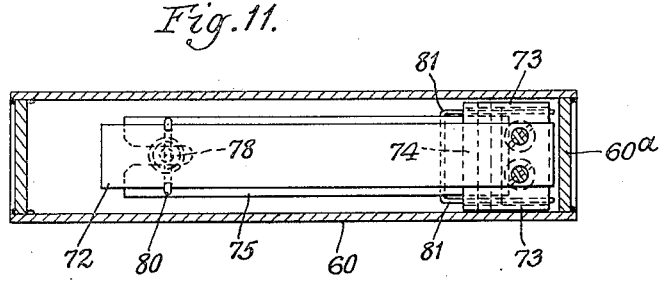
Inventor
Willard L. Morrison
by Parker & Carter
Attorneys.

Patented Apr. 4, 1950

2,502,663

UNITED STATES PATENT OFFICE 2,502,663

REFRIGERANT CONTROL SYSTEM

Willard L. Morrison, Lake Forest, Ill.

Application May 12, 1944, Serial No. 535,227

8 Claims. (Cl. 62—8)

My invention relates to an improved refrigeration valving and control system. One purpose is to provide such a system which is inexpensive to manufacture.

Another purpose is to provide such a system which is relatively free from service needs and service expense.

Another purpose is to provide a system which is protected from unsightliness and untidiness caused by condensation and accumulation of moisture from the humid atmosphere.

A primary purpose is to provide a system in which the necessity of careful metering of the total quantity of refrigerant used in the system is avoided.

Another purpose is to provide a system which will permit closely similar temperatures to be maintained in the interiors of two evaporators operating with one compressor.

Another purpose is to provide a predictable metering of a refrigerant from the receiver to the evaporator.

Another purpose is to provide a system in which the shut off valve is maintained in a warm zone and in which no moving part is subjected to cold, and the freezing of moving valve parts is prevented.

Other purposes will appear from time to time in the course of the specification and claims.

I illustrate my invention more or less diagrammatically in the accompanying drawings wherein:

Figure 2 is an elevation of the structure shown in Figure 3;

Figure 3 is a section on the line 3—3 of Figure 2;

Figure 4 is an elevation of the structure shown in Figure 5 of one of the elements of the valve shown in Figure 3;

Figure 5 is a section through the element shown in Figure 4;

Figure 6 is a section through a spacing element;

Figure 7 is a section through another of the valve elements;

Figure 8 is an elevation of the element shown in Figure 7;

Figure 9 is a section on the line 9—9 of Figures 1 and 10;

Figure 10 is a section on the line 10—10 of Figure 9;

Figure 11 is a section on the line 11—11 of Figure 9.

Like parts are indicated by like symbols throughout the specification and drawings.

Figure 1:
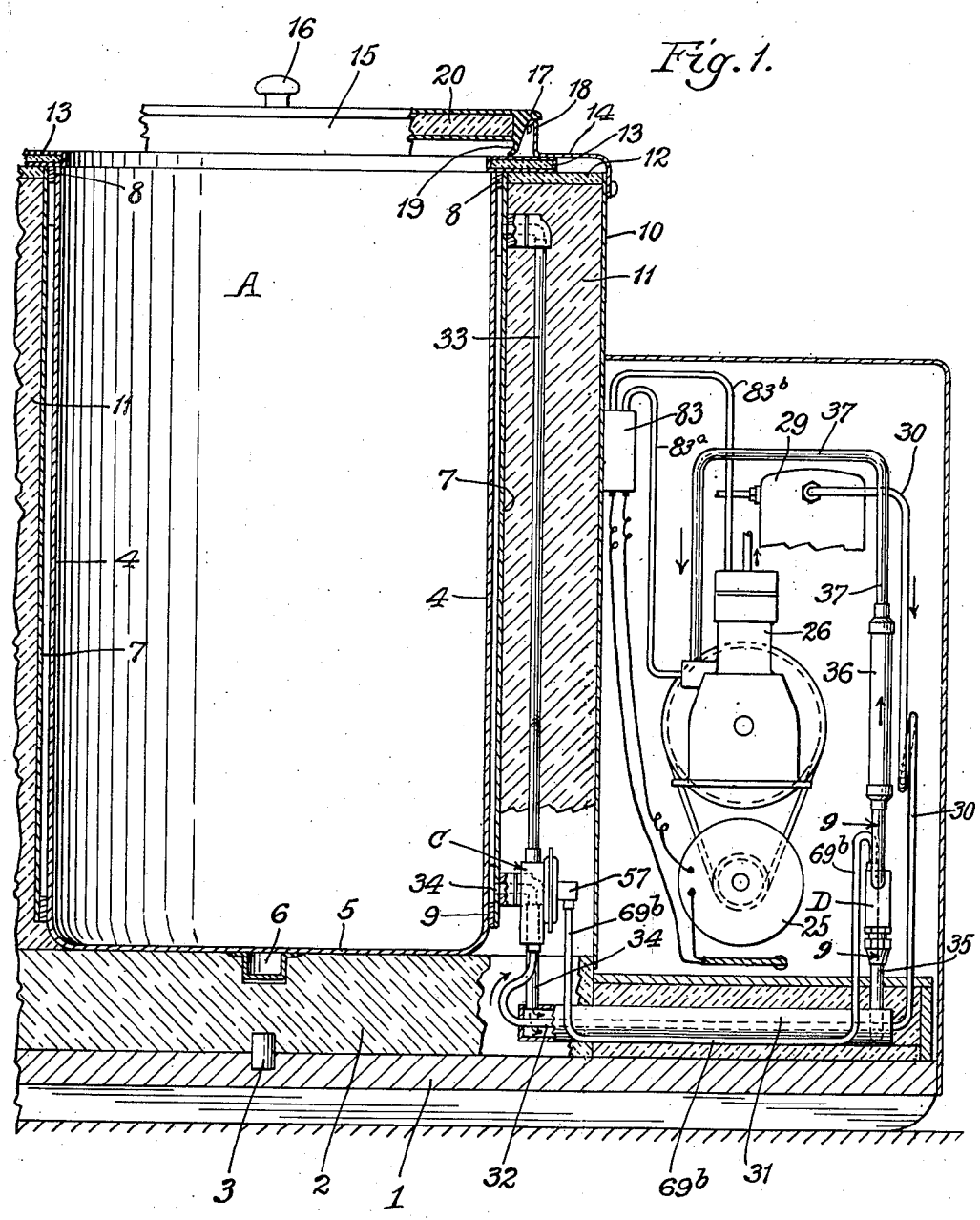
Figure 1 is a sectional view of the apparatus.

Referring to the drawings, 1 generally indicates any suitable base or bottom member on which may be positioned a relatively thick insulating disc or insulating member 2. In the form of Figure 1 such a member is large enough to support a single evaporator. The members 1 and 2 may be held in place in any suitable fashion as for example by a dowel 3. A generally indicates an evaporator storage element including an inner cylinder 4 having a bottom portion 5 and a centering element 6 which extends into any appropriate aperture in the member 2. 7 is an outer cylinder which is sealed at top and bottom to the inner cylinder 4 as at 8, 9. Any suitable baffling or refrigerant directing means may be employed, not herein indicated in detail, for maintaining a distribution of the refrigerant throughout the exterior surface of the inner cylinder 4. Preferably appropriate means are employed for maintaining a flow of refrigerant across substantially the entire exterior surface of at least the side wall of the cylinder 4, whereby substantially the entire area of said side wall becomes a primary refrigerating surface. The evaporator storage unit thus formed is shown as having an open top. It may be surrounded by any suitable exterior wall or shell 10 which may for example be of relatively flexible sheet material, as the evaporator is adapted to serve as the central support and sole frame structure of the device.

Insulating material 11 may be packed in between the members 7 and 10 and firmly supports the outer shell 10 and provides a firm and effective insulating wall about the evaporator A. Any suitable top closure seal 12 may be employed, preferably of insulating material. A top ring insulating member 13 is also illustrated and an outer top shell 14 may be of metal, since no part of it approaches the storage space within the unit. 15 is any suitable removable cover with a manual knob 16 and an outer flange 17 resting on the upper flange 18 of the member 14 and a lower flange 19 resting on the sealing element 13. Flanges 17 and 19 may be somewhat flexible and may be made for example of rubber or a rubber substitute. The entire cover may be made of rubber or of a rubber substitute, of any suitable interior heat insulating reinforcement 20. As will later appear the connections for the evaporator through which the refrigerant is supplied to and withdrawn from the evaporator formed by the members 4 and 7, may be embedded in the insulation 11 which is initially inserted in divided or soft condition. 25 indicates any suitable motor the details of which do not form part of the present invention. 26 is any suitable compressor driven from the motor 25 for example by the belt 27. 28 is any suitable condenser coil or system of passages which receives the refrigerant delivered from the compressor. 29 is any suitable receiver and 30 is a refrigerant passage extending from the receiver to any suitable heat exchange member 31. I illustrate for example a central passage 32, in communication with the duct 30 extending to the valve structure generally indicated as C which will later be described in detail. 33 is a delivery duct, located within the insulation 11, which delivers the refrigerant to the top of the evaporator A. In the form of Figure 1 the outlet passage 34 extends to the interior of the heat exchanger housing 31 and flows about the inner passage 32, any suitable fin, projections or the like 32a being employed to increase the effectiveness of the heat exchange and to multiply the heat exchanging surface. The discharge passage 35 then extends to the assembly D, which will later be described in detail and the refrigerant passes thence through the strainer 36 and the duct 37 to the compressor 26.

In order to obtain the above mentioned advantages I provide the following structure in addition to, and included in the above described refrigerating circuit. I provide a restrictor assembly, generally indicated at C in Figure 1 and shown in detail in Figures 2 to 8 inclusive, interposed in between the liquid lines 32 and 33 along which liquid flows from the receiver to the evaporator. The restrictor includes a body or housing 40 having an inner bore 41 closed by a closure end portion 42 in direct communication with the liquid delivery tube 32. Positioned in a bore 41 are a succession of thin discs 43, 44 separated by spacing rings 45, the entire series being positioned between and held in position by the opposed shoulders 46 and 47 of the members 42 and 40. This restrictor operates on a principal of the conversion of potential energy into kinetic energy, and the loss or use of that kinetic energy by liquid turbulence. Within the body 40 is a succession of thin discs 43 and 44 each with a minute aperture. The aperture of each disc 43 is centrally located as at 43a. The aperture of each disc 44 is eccentrically located as at 44a. The spacers 45 provide a space between each said disc and the discs 43 and 44 alternate in the series. The liquid refrigerant passing through the central aperture in the first of the discs 43, passes into the space provided by the spacer 45 and impinges against the central portion of the adjacent disc 44, thereby losing its kinetic energy. Again the liquid passes through the eccentric orifice in the adjacent disc 44, passes into the next space and impinges eccentrically against the surface of the next disc 43. This succession of impingements of a jet against a solid surface may continue through a substantial number of discs. I illustrate for example, 16 discs in the patent drawings, though the number of discs may be varied. I have employed as many as 20 discs, ten of the discs 43 and ten of the discs 44. The result of the passage of the liquid through the series of discs, and the impingement against the adjacent discs is a reduction of the pressure of the refrigerant from the high side to the low side pressure of the system, by the time the refrigerant has passed through the entire disc series, as long as the refrigerant is flowing at the normal rate.

In order to control the passage 40a through the valve seat 47, I provide the following structure. 51 and 52 are casing members which define a diaphragm chamber including the space 48 at one side of the diaphragm 53 and the space 49 at the opposite side of the diaphragm. The diaphragm 53 carries a valve member 54 adapted normally to be held in closed position against the seat 47 thus preventing any flow of refrigerant through or from the restrictor assembly C. This result is obtained by the compression of the spring 55, one end of which abuts against the plate 56 of the diaphragm, the other end abutting against the outer end of the spring housing 57. The valve stem 54a is guided in a member 54b which is secured in the housing 57 by the exteriorly headed screw 58. The movement of the valve 54 is controlled by the Venturi assembly D illustrated for example in Figures 9 to 11. The passage 35 is connected to the suction outlet of the evaporator, being in communication with the outlet passage 34 and the interior of the heat exchanger housing 31. It extends to the interior of the Venturi chamber which encloses the Venturi assembly D. The passage 35 may be connected to the housing 60 for example by the fitting 61 and nut 62. When the compressor is operating, the refrigerant is drawn along the passage 35 to the interior of the chamber 60. It is drawn thence along the suction line or passage 37 back to the compressor. 63 is a Venturi element mounted in the chamber 60 and directly associated with the end of the suction line 37. The throat 64 of the venturi is connected by means of a labyrinth consisting of the passages 65, 66, 67 and 68 to the bore of the fitting 69 to which is attached by means of the nut 69a one end of a small tube 69b of copper or the like. The opposite end of the copper tube 69b is connected to the spring housing 57 associated with the restrictor structure shown in Figure 3, and is in communication with the space 49 of the diaphragm chamber formed by the members 51 and 52.

The passage of the refrigerant vapor through te throat 64 of the venturi 63, when the compressor is operating, causes a decrease of pressure at the Venturi throat 64. This decrease of pressure is communicated by the passage 69b to the above described diaphragm chamber 49 the pressure being communicated to the space 48 from the evaporator, the pressure in the passage 33 being in excess of the pressure in the chamber portion 49, the diaphragm 53 will move downwardly to the position shown in Figure 3 against the compression of the spring 55, thereby withdrawing the valve 54 from the seat 47 and permitting refrigerant from the restrictor assembly to pass through the valve, into the chamber or space 48 and thence through 50 and 50a to the supply passage 33 to the evaporator.

Should anything cause the circuit of the motor 25 which operates the compressor 26, to be broken, the velocity of the gas through the Venturi throat 64 will drop to zero. There will be no reduction of pressure in the diaphragm chamber 49, and the spring 55 will be effective to move the valve 54 to closed position. Thus the passage 33 will be closed in prompt response to motor stoppage.

Within the chamber 60 is a valve seat 70, as shown in Figures 9 and 10, which defines a passage or inlet 71 to the ducts 67 of the Venturi labyrinth. This valve seat is normally closed by the reed valve 72. 73 is a bracket which pivotally supports a circular bearing 74. About this bearing 74 is secured a hairpin member 75 which is of thermostatic bimetal material, with the active side of the bimetal on the inside of the hairpin. A light wire spring 81 passes between the bracket 73 and the bimetal strip 75 around the circular bearing 74 and across a lower side of the lower arm 75a of the hairpin, and back in reverse around the cylindrical bearing 74. The spring 81 thus tends to cause a clockwise movement of the entire hairpin structure around the pivot of the bearing 74, and tends normally to hold the reed valve 72 against the valve seat 70. Normally the free end 75a of the hairpin is in the position shown in dotted lines at 75b, with the two sides of the hairpin approximately parallel. During the soldering operation which may be necessary to close the end 60a of the housing 60, the bimetal hairpin may be heated to as much as 200° F. or more. In that case the free end of the bimetal hairpin may move to the dotted line position 75c. However, at normal temperature it takes the position shown at 75b. In the operation of the device, should the gases rising through the tube or passage 35 to the interior of the housing chill the bimetal hairpin 75 to a predetermined temperature in the vicinity, of say 10° F., the hairpin will close to the position shown in full line at 75a, and the notched end will come into contact with the head 78 of the adjusting screw 77 the position of which may be controlled by the exterior screw member 79. The other end of the hairpin carries fastened to it a clip 80 which passes around the reed valve 72 and which will lift the reed valve away from the valve seat 70 whenever the free end of the hairpin has engaged the head 78 and further force is applied through further contacts of the hairpin 75 by chilling. When that takes place gas in the housing 60 can pass directly through the space 71 within the valve seat 70, thereby destroying the reduction of pressure due to the venturi, even though the compressor be still running. This will permit the spring 55 to move the valve 54 into closed position even though the compressor is still running, thereby cutting off the supply of refrigerant to the evaporator along the passage 33, and preventing the chilling of the suction line to the extent of condensing moisture out of a humid atmosphere.

The refrigerant supply to the evaporator having thus been cut off, the residual refrigerant already supplied to the evaporator will lose pressure through evaporation and chilling, and the pressure switch 83 and its ducts 83a and 83b controlling the motor current will open, thereby stopping the refrigeration activities.

Meanwhile atmospheric heat will be received by the passage 37, which is outside of the insulation, as is the whole Venturi assembly, and the connected housing 60. Through them the atmospheric heat will be transmitted to the bimetal hairpin 75, permitting it slowly to reclose the reed valve 72 against its seat 70. Thus when the pressure switch recloses and the motor starts, the passage of gas through the Venturi throat 64 will again result in the opening of the valve 54 and the readmission of refrigerant to the evaporator.

It will be realized that whereas I have shown a practical and operative device, nevertheless many changes may be made in the size, shape, number and disposition of parts without departing materially from the spirit of my invention. I therefore wish the drawings to be taken as in a broad sense as illustrative or diagrammatic rather than as limiting me to my precise showing.

I claim:

1. In a refrigerating system including means for enclosing a quantity of liquid refrigerant, means for reducing it from a relatively high pressure to a relatively low pressure, an evaporator, means for introducing the refrigerant into the evaporator, in liquid form, and at a relatively low pressure, means for increasing the pressure of the refrigerant after it has been discharged in gaseous form from the evaporator, and means for preventing the passage of liquid into the evaporator, including a valve in the line of liquid flow between the pressure reducing means and the evaporator, and means for moving said valve to closing position when the pressure increasing means is not functioning, including a venturi in the line of flow of the evaporated refrigerant and a pressure connection between the throat of said venturi and said valve.

2. In a refrigerating system including means for enclosing a quantity of liquid refrigerant, means for reducing it from a relatively high pressure to a relatively low pressure, an evaporator, means for introducing the refrigerant into the evaporator, in liquid form, and at a relatively low pressure, means for increasing the pressure of the refrigerant after it has been discharged in gaseous form from the evaporator, and means for preventing the passage of liquid into the evaporator, including a valve in the line of liquid flow between the pressure reducing means and the evaporator, and means for moving said valve to closing position when the pressure increasing means is not functioning, including a venturi in the line of flow of the evaporated refrigerant and a pressure connection between the throat of said venturi and said valve, and additional means for actuating said valve, through said pressure connection, in response to a predetermined drop in the temperature of the evaporated refrigerant.

3. In a refrigerating system including means for enclosing a quantity of liquid refrigerant, means for reducing it from a relatively high pressure to a relatively low pressure, an evaporator, means for introducing the refrigerant into the evaporator, in liquid form, and at a relatively low pressure, means for increasing the pressure of the refrigerant after it has been discharged in gaseous form from the evaporator, and means for preventing the passage of liquid into the evaporator, including a valve in the line of liquid flow between the pressure reducing means and the evaporator, and means for moving said valve to closing position when the pressure increasing means is not functioning, including a venturi in the line of flow of the evaporated refrigerant and a pressure connection between the throat of said venturi and said valve, and additional means for actuating said valve, in response to a predetermined drop in the temperature of the evaporated refrigerant.

4. In a refrigerating system including a compressor-condenser unit, an evaporator, a supply passage extending from the compressor-condenser unit to the evaporator and a return passage extending from the evaporator to the compressor-condenser unit, a valve in said supply passage and means for actuating said valve including a venturi in said return passage, a diaphragm housing, a spring loaded diaphragm in said housing, dividing said housing into two spaces, one of which is adapted for communication with the supply passage, and passage extending between the opposite side of said diaphragm and the throat of said venturi, said valve being mounted on said diaphragm.

5. In a refrigerating system including a compressor-condenser unit, an evaporator, a supply passage extending from the compressor-condenser unit to the evaporator and a return passage extending from the evaporator to the compressor-condenser unit, a valve in said supply passage and means for actuating said valve including a venturi in said return passage, a diaphragm housing, a spring loaded diaphragm in said housing, dividing said housing into two spaces, one of which is adapted for communication with the supply passage, and passage extending between the opposite side of said diaphragm and the throat of said venturi, said valve being mounted on said diaphragm, and a labyrinth in line between said Venturi throat and the passage to the diaphragm.

6. In a refrigerating system including a compressor-condenser unit, an evaporator, a supply passage extending from the compressor-condenser unit to the evaporator and a return passage extending from the evaporator to the compressor-condenser unit, a valve in said supply passage and means for actuating said valve including a venturi in said return passage, a diaphragm housing, a spring loaded diaphragm in said housing, dividing said housing into two spaces, one of which is adapted for communication with the supply passage, and passage extending between the opposite side of said diaphragm and the throat of said venturi, said valve being mounted on said diaphragm, and means for by-passing said venturi when there is a predetermined temperature drop of the evaporated refrigerant flowing through said venturi, and for thereby destroying the pressure differential between the opposite sides of the diaphragm housing.

7. In a refrigerating system, control means responsive to temperature changes in the flow of an evaporated refrigerant, including a housing the interior of which is in the line of flow of said evaporated refrigerant, a venturi associated with said housing and in said line of flow, a suction duct extending from the throat of said venturi, said duct having an alternate passage connection with the interior of said housing, means for normally closing said alternate passage connection, and means for opening said connection and for thereby by-passing said Venturi throat, in response to a predetermined drop in temperature of the evaporated refrigerant.

8. In a refrigerating system, control means responsive to temperature changes in the flow of an evaporated refrigerant, including a housing the interior of which is in the line of flow of said evaporated refrigerant, a venturi associated with said housing and in said line of flow, a suction duct extending from the throat of said venturi, said duct having an alternate passage connection with the interior of said housing, means for normally closing said alternate passage connection, including a valve and a heat responsive element adapted normally to hold said valve in closed position, said heat responsive member being adapted in response to a predetermined drop in temperature of the evaporated refrigerant, to move said valve to the open position.

WILLARD L. MORRISON.

REFERENCES CITED

The following references are of record in the file of this patent:

UNITED STATES PATENTS

| Number | Name | Date |
|---|---|---|
| 2,118,295 | Crawford | May 24, 1938 |
| 2,148,413 | Labberton | Feb. 21, 1939 |
| 2,183,346 | Buchanan | Dec. 12, 1939 |
| 2,326,093 | Carter | Aug. 3, 1943 |
| 2,331,264 | Carter | Oct. 5, 1943 |
| 2,368,592 | Dillman | Jan. 30, 1945 |